United States Patent [19]
Nojiri et al.

[11] Patent Number: 5,487,512
[45] Date of Patent: Jan. 30, 1996

[54] TAKE-UP APPARATUS FOR AND PACKAGE OF TAPE TYPE NON-TWISTED CARBON FIBER BUNDLE

[75] Inventors: Hironobu Nojiri; Kazuyuki Yakushiji, both of Ehime; Minoru Yoshinaga, Yokohama; Hiroyuki Terasaka, Ohtsu, all of Japan

[73] Assignee: Toray Industries, Inc., Tokyo, Japan

[21] Appl. No.: 214,181

[22] Filed: Mar. 17, 1994

Related U.S. Application Data

[62] Division of Ser. No. 944,736, Sep. 14, 1992, which is a continuation of Ser. No. 722,539, May 20, 1991.

[30] Foreign Application Priority Data

May 21, 1990 [JP] Japan ...................... 2-131912

[51] Int. Cl.⁶ .......................... B65H 18/08; B65H 54/00; B65H 23/02
[52] U.S. Cl. .......................... 242/471; 242/42; 242/157.1; 242/548.1; 226/197
[58] Field of Search .............................. 242/42, 159, 166, 242/174, 176, 178, 471, 157 R, 157.1, 548.1, 419.6; 226/197, 189

[56] References Cited

U.S. PATENT DOCUMENTS

| | | | |
|---|---|---|---|
| 1,827,079 | 10/1931 | Fahrenwald | 226/189 X |
| 1,867,596 | 7/1932 | Roseman . | |
| 2,135,668 | 11/1938 | Judelshon . | |
| 2,345,544 | 3/1944 | Worthington . | |
| 2,451,533 | 10/1948 | Cannon . | |
| 2,972,796 | 2/1961 | Block . | |
| 3,365,145 | 1/1968 | Klink et al. . | |
| 3,371,877 | 3/1968 | Klink et al. . | |
| 3,438,587 | 4/1969 | Jackson, Jr. | 242/42 |
| 3,466,716 | 9/1969 | Hancock et al. | 226/197 X |
| 3,657,974 | 4/1972 | Hedrich et al. | 226/197 X |
| 3,802,615 | 4/1974 | Bundschuh | 226/197 X |
| 3,997,122 | 12/1976 | Helfand et al. . | |
| 4,040,575 | 8/1977 | Ryan | 226/197 X |
| 4,489,901 | 12/1984 | Anderson . | |
| 4,586,679 | 5/1986 | Yamamoto et al. . | |
| 4,645,135 | 2/1987 | Morris et al. . | |
| 4,802,636 | 2/1989 | Frick et al. . | |
| 4,989,799 | 2/1991 | Nakai et al. | 242/157 R X |
| 5,315,461 | 5/1994 | Todd | 226/197 X |

FOREIGN PATENT DOCUMENTS

| | | | |
|---|---|---|---|
| 1378664 | 10/1964 | France | 242/471 |
| 1102760 | 7/1984 | U.S.S.R. | 242/471 |

*Primary Examiner*—John M. Jillions
*Assistant Examiner*—Michael R. Mansen
*Attorney, Agent, or Firm*—Nikaido, Marmelstein, Murray & Oram

[57] ABSTRACT

A take-up apparatus is disclosed for tape type non-twisted carbon fiber bundles, in which a traverse guide unit consists of an introduction guide roller disposed so that an angle $\theta_1$ between the introduction guide roller and the axial direction of the bobbin is substantially 90°, a final guide roller disposed so that an angle $\theta_e$ between it and the axial direction of the bobbin is $-5°\pm10°$ (i.e., $-15°$ to $+5°$), and at least one intermediate guide roller disposed between the introduction guide roller and final guide roller so that an angle difference between an intermediate guide roller and an adjacent guide roller is not more than 45°. A take-up apparatus is also disclosed for tape type non-twisted carbon fiber bundles, in which a traverse guide unit has a helically continuing curved guide surface, an initial portion, i.e. an introduction surface portion of the curved guide surface extending at substantially right angles to the axial direction of a bobbin, and a final portion, i.e. discharge surface portion of the curved guide surface extending at an angle in the range of $-5°\pm10°$ with respect to the axial direction of the bobbin.

3 Claims, 5 Drawing Sheets

TAKE-UP APPARATUS FOR AND PACKAGE OF TAPE TYPE NON-TWISTED CARBON FIBER BUNDLE

This is a divisional, of application Ser. No. 07/944,736 filed Sep. 14, 1992 which is a continuation of application Ser. No. 07/722,539 filed on May 20, 1991.

BACKGROUND OF THE INVENTION

This invention relates to a take-up apparatus for and a package of a tape type non-twisted carbon fiber bundle, and more particularly to a take-up apparatus capable of taking up a tape type non-twisted carbon fiber bundle around a bobbin regularly in a diagonally crossing state without causing folds to occur in the fiber bundle; and a package of such a fiber bundle paid out from the same apparatus.

BACKGROUND OF THE INVENTION

Since a carbon fiber has extremely high specific strength and specific elastic modulus, a high thermal resistance and excellent chemical resisting performance, it is used as a reinforcing material for aerospace equipment as well as sports equipment and equipment for leisure time amusement, such as a golf club, a tennis racket and a fishing rod. When such a carbon fiber is used as a reinforcing material for these products, a carbon fiber bundle impregnated with an uncured resin composition, such as epoxy resin and unsaturated polyester is obtained first, and a plurality of such carbon fiber bundles are then arranged in one direction so that no clearances occur therebetween, to form a thin sheet type prepreg.

In recent years, it has been demanded that the weights of the above-mentioned products be reduced, and the reduction of the thickness of a sheet type prepreg has been in keen demand accordingly. In order to reduce the thickness of the prepreg, a carbon fiber bundle, which is a raw material of the prepreg, and which was formerly used in the shape of a rope, has come to be used in the shape of a non-twisted tape. This tape type non-twisted carbon fiber bundle is impregnated with a resin and then taken up once around a bobbin to be formed into a package. A sheet type prepreg is formed by withdrawing tape type carbon fiber bundles from a plurality of packages thus obtained and arranging these fiber bundles so that no clearances are left therebetween. In order to arrange the tape type carbon fiber bundles so as not to cause any clearance to occur therebetween as mentioned above, it is necessary that the width of each carbon fiber bundle be constant in the lengthwise direction thereof.

However, when a tape type non-twisted carbon fiber bundle is taken up around a bobbin in a conventional take-up apparatus as the fiber bundle is traversed on the bobbin, to be formed into a package, folds occur at the fold-back ends of the fiber bundle, so that the width of the fiber bundle cannot be set constant in the lengthwise direction thereof. A conventonal take-up apparatus consists of a feed roller 101, a pair of traverse guide rollers 102 and a bobbin 103 as shown schematically in FIG. 6. The traverse guide rollers 102 are disposed so that the axes thereof extend at right angles to that of the bobbin 103, and a tape type carbon fiber bundle F is supplied between these two guide rollers 102 so as to be held therebetween. The fiber bundle thus held between the guide rollers is taken up around the bobbin 103 to be formed into a package P as the fiber bundle F is traversed on the bobbin 103 reciprocatingly from one end thereof to the other in parallel with the axis thereof. While the tape type carbon fiber bundle F is taken up from the two guide rollers 102 around the bobbin 103, the flat surface of the fiber bundle F is twisted at 90°, and, moreover, the direction of the twist is reversed when the fiber bundle F is folded back at the end of each traversing. Therefore, for example, the tape type carbon fiber bundle F forms a fold f, in such a way that the bundle is bent over on itself with the upper surface turned facedown, on an end portion of the package P as shown in FIG. 7.

A tape type carbon fiber bundle F on which folds f occur as mentioned above is not smoothly unfolded when it is withdrawn from the package P to be formed into a sheet type prepreg, and clearances occur during such time among the parallel-fed fiber bundles. This causes the quality of a product made of a prepreg thus prepared to lower.

SUMMARY OF THE INVENTION

An object of the present invention is to provide a take-up apparatus capable of taking up a tape type non-twisted carbon fiber bundle regularly in a diagonally crossing state without causing folds to occur on the fiber bundle.

Another object of the present invention is to provide a package of a tape type non-twisted carbon fiber bundle which displays excellent opening and spreading characteristics when the fiber bundle is released from the package.

To attain these objects, the take-up apparatus according to the present invention is provided with a structure consisting of a plurality of guide rollers or a structure consisting of a helically continuing curved guide surface as a guide unit adapted to traverse between a feed roller and a bobbin in the axial direction of and relatively to the bobbin. The former structure consisting of guide rollers has an introduction guide roller disposed at substantially right angles to the axis of the bobbin, a final guide roller disposed at −5°±10° (i.e., −15° to +5°) to the axis of the bobbin, and at least one intermediate guide roller disposed between the introduction guide roller and final guide roller so that an angle difference between an intermediate guide roller and an adjacent guide roller is not more than 45°. The latter structure consisting of a helically continuing curved guide surface has an introduction portion, which is formed so as to extend at substantially right angles to the axis of the bobbin, of the guide surface, and a discharge portion, which is formed so as to extend at −5°±10° with respect to the same axis, of the same guide surface.

Such a structure, consisting of guide rollers or such a structure consisting of a helical curved guide surface, is adapted to move traversely relatively to the bobbin. This traverse movement may be achieved by the structure mentioned above or by the bobbin. The take-up operation of this take-up apparatus is carried out preferably by setting a winding angle $\theta_w$ between the carbon fiber bundle winding (advancing) direction and the rotational (circumferential) direction of the bobbin, i.e. a winding angle not more than 20° (see FIG. 1B).

According to the present invention, which is provided with the guide unit described above, a tape type non-twisted carbon fiber bundle can be taken up regularly in a diagonally crossing state without causing any folds to occur at an end portion of a package. A package thus obtained does not have a fold of a carbon fiber bundle at an end portion of the package, so that the width We of the u-shaped 100 portion of the carbon fiber bundle which is wound around an end section of the package and that a width Wc of the portion thereof which is wound around an intermedite section of the package can be set substantially equal (see FIG. 1C). This enables the opening characteristics of the tape type non-twisted carbon fiber bundle released from the package to be improved, and the width of the fiber bundle to be maintained at a constant level in the lengthwise direction thereof.

DETAILED DESCRIPTION OF THE PREFERRED EMBODIMENTS

Figure 5:
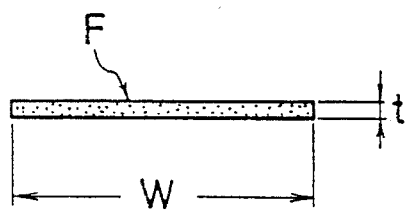
FIG. 5 is a sectional view of the tape type non-twisted carbon fiber bundle subjected to a take-up operation in the present invention.

A tape type non-twisted carbon fiber bundle to which the present invention is applied is a fiber bundle consisting of a plurality of carbon fiber filaments consolidated into a sheet by impregnating the same with an uncured resin composition, such as epoxy resin and unsaturated polyester. The tape type means a bundle having a flatness ratio W/t, i.e. a ratio of the width W to the thickness t of at least 10 as shown in the sectional view of FIG. 5, and formed continuously in the lengthwise direction thereof. A flat surface of a tape type carbon fiber bundle indicates a surface on a longer side of a cross section thereof. Accordingly, a tape type carbon fiber bundle has two flat surfaces, i.e. upper and lower flat surfaces.

Figure 2:
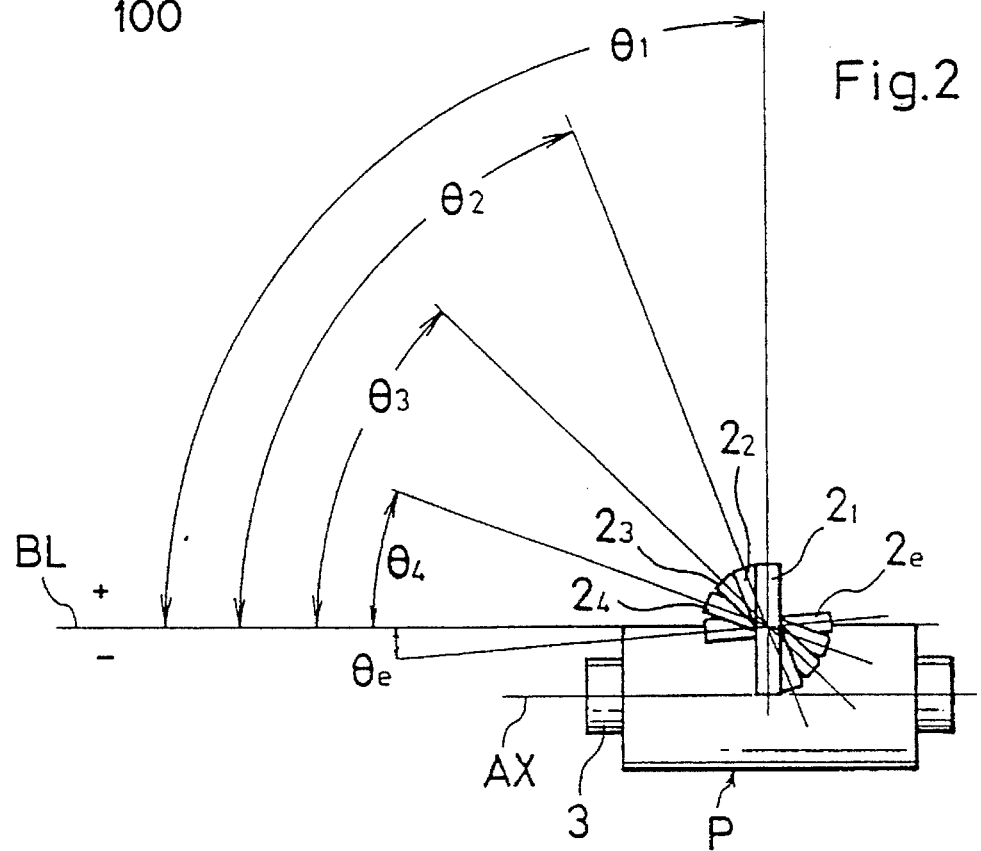
FIG. 2 shows the angles between guide rollers and the axis of a bobbin in the same take-up apparatus.

An angle θ defined in the present invention is an angle between the axis of each of guide rollers or a helical curved surface and the axis of a bobbin, which is, for example, an angle measured with respect to a reference line BL parallel to the axis AX of a bobbin as shown in FIG. 2 showing the case of guide rollers as an example. The $\theta_1$ represents an angle of an introduction guide roller $2_1$, $\theta_e$ an angle of a final guide roller $2_e$, and $\theta_2$, $\theta_3$, $\theta_4$ the angles of intermediate guide rollers $2_2$, $2_3$, $2_4$. The angle θ measured clockwise from the reference line BL is to indicate a positive angle, and the angle θ measured counterclockwise therefrom a negative angle.

A bobbin rotating unit used in the present invention may employ either a center drive system in which a bobbin support shaft is rotated or a surface drive system in which a bobbin is rotated by applying a frictional force to the surface of a package, which is wound around the bobbin, in the circumferential direction thereof. The bobbin and the guide unit may move transversely relative to each other in the direction parallel to the axis of the bobbin, and a traversing unit may therefore be adapted to drive either one of the guide unit and the bobbin. It is more preferable that the guide unit be moved traversely as will be described in the following embodiments.

Figure 1A:
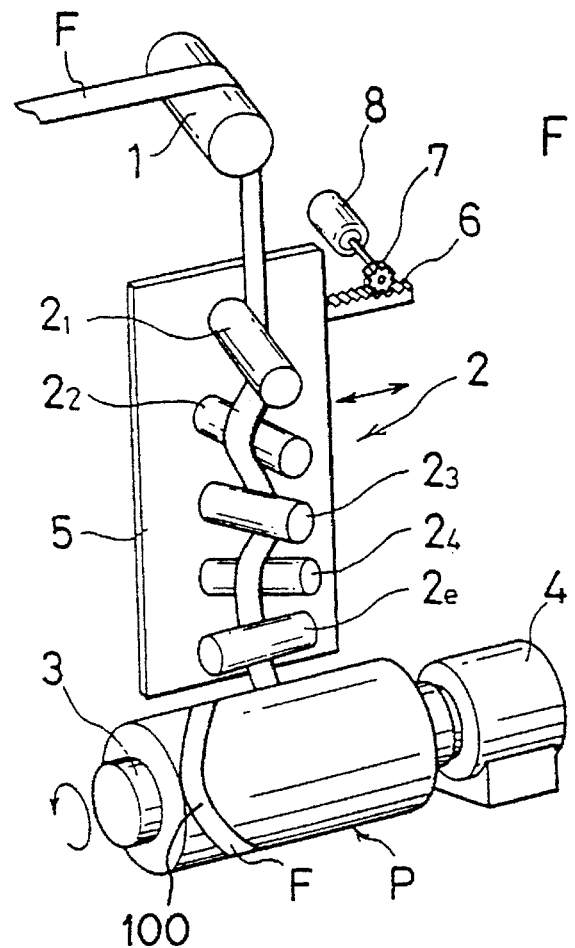
FIG. 1A is a schematic perspective view of an embodiment of the take-up apparatus according to the present invention.
Figure 1B:
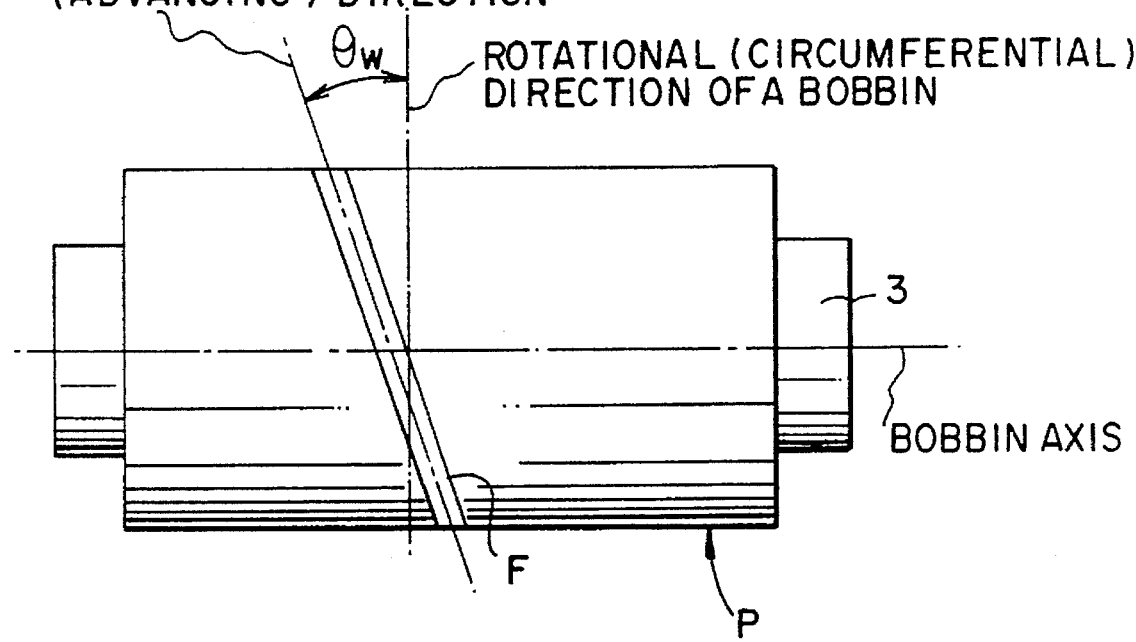
FIG. 1B shows the winding angle and FIG. 1C shows the widths of the fiber bundle on the bobbin.

In the take-up apparatus shown in FIG. 1, a tape type non-twisted carbon fiber bundle F is fed from a supply roller 1 and taken up around a bobbin 3 via a traverse guide unit 2. The supply roller 1 is disposed at right angles to the axial direction of the bobbin. The bobbin is adapted to be rotated in the direction of an arrow by a center drive system using a driving motor 4 as a driving means.

The traverse guide unit 2 consists of a plurality of guide rollers $2_1$, $2_2$, $2_3$, $2_4$, $2_e$ which are supported freely rotatably on a support plate 5. This support plate 5 is adapted to be moved traversely in parallel with the axis of the bobbin by a traversing unit consisting of a rack 6, a pinion 7 and a reciprocatingly rotating driving motor 8. In the guide rollers mentioned above, the initial introduction guide roller $2_1$ is disposed so that an angle $\theta_1$ becomes 90° with respect to the axis of the bobbin, and the final guide roller $2_e$ so that an angle $\theta_e$ be in the range of $-5°\pm10°$ (i.e., $-15°$ to $+5°$). The intermediate guide rollers $2_2$, $2_3$, $2_4$ are disposed so that the angles $\theta_2$, $\theta_3$, $\theta_4$ become gradually smaller than the angle $\theta_1$ of the introduction guide roller $2_1$ with a difference between the angles of adjacent intermediate guide rollers set not more than 45°. These guide rollers $2_1$, $2_2$, $2_3$, $2_4$, $2_e$ are adapted to bring the tape type carbon fiber bundle F into contact initially with the introduction guide roller $2_1$ and then with the guide rollers $2_2$, $2_3$, $2_4$, $2_e$ in order to cause the fiber bundle F to move zigzag, whereby the flat surfaces of the fiber bundle are twisted gradually and set parallel on the final guide roller $2_e$ to the axis of the bobbin, the fiber bundle F being then taken up around the bobbin 3.

Since the traverse guide unit 2 has such an operation, the angle $\theta_1$ of the initial introduction guide roller $2_1$ with respect to the axis of the bobbin has to be maintained at substantially 90°. If this angle $\theta_1$ exceeds or falls below 90°, the carbon fiber bundle being moved traversely is inclined with respect to the axes of the guide rollers to cause the width of range of winding of the fiber bundle to decrease or a disturbance to occur on the end surfaces of a package P.

The intermediate guide rollers $2_2$, $2_3$, $2_4$ are adapted to gradually twist the flat surfaces of the carbon fiber bundle, which they receive from the introduction guide roller $2_1$ toward the axial direction of the bobbin so that these surfaces become parallel to the same direction on the final guide roller $2_e$. When a twisting force is thus applied to a flat surface of the tape type carbon fiber bundle, a twist phase difference occurs in the widthwise direction thereof. Since such a twist phase difference becomes large at both edge portions of the fiber bundle as compared with that at the middle portion thereof, uneven tension distribution occurs in the widthwise direction of the fiber bundle. Therefore, if the twisting force applied to the fiber bundle is suddenly increased, the width of the corresponding part of the fiber bundle decreases or this part of the fiber bundle is folded. In order to prevent such phenomena, it is necessary that an angle difference between adjacent intermediate guide rollers be set to 45° at most, and preferably to not more than 35°.

When the tape type non-twisted carbon fiber bundle is moved to the left and right by the traverse guide unit 2 in this take-up apparatus, the width of the fiber bundle is varied.

Figures 4A, 4B, 4C:
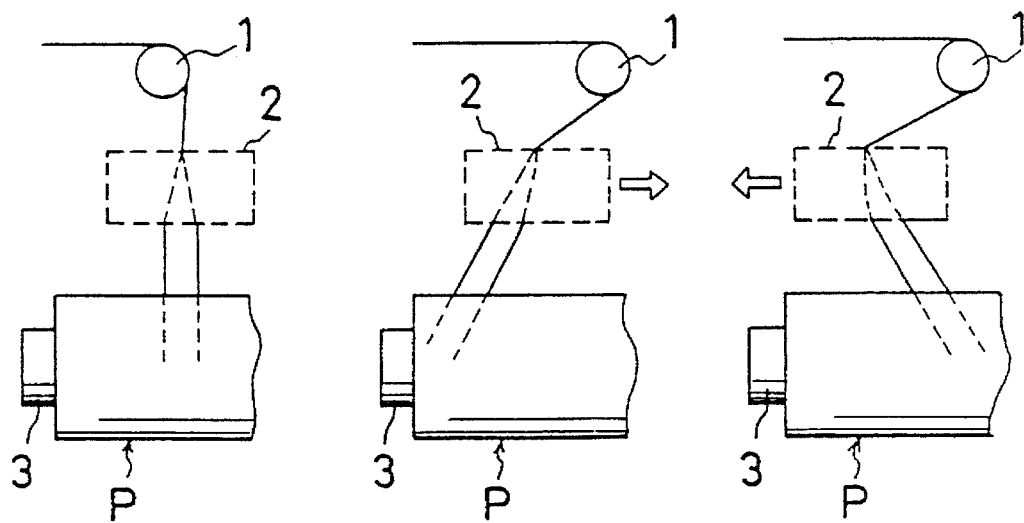
FIGS. 4A, 4B and 4C illustrate the influence of a traverse action of a traverse guide unit on a tape type carbon fiber bundle during the winding of the fiber bundle around a bobbin carried out by the take-up apparatus according to the present invention.

This action will be described with reference to FIGS. 4A, 4B and 4C. While the traverse guide unit 2 is not in traverse motion, the path along which the tape type carbon fiber bundle F advances does not vary as shown in FIG. 4A, so that the width of the fiber bundle is maintained at a constant level. However, while the traverse guide unit 2 is moved to the right, the tape type carbon fiber F moves therefrom, delays backward and reaches the bobbin 3 as shown in FIG. 4B. This backward delay of the tape type carbon fiber bundle F spreads to guide rollers in the traverse guide unit 2, so that the fiber bundle F advances to the inner portion of the guide rollers and moves in the direction in which the twist of the fiber bundle F is lessened. Therefore, the width of the fiber bundle F measured parallel to the axis of the bobbin 3 at the twist tends to increase as compared with that in the condition shown in FIG. 4A, in which the traverse guide unit 2 is not in traverse motion. Conversely, when the traverse guide unit 2 is moved to left, the fiber bundle follows the traverse action thereof in a backwardly delayed state as shown in FIG. 4C. Although this phenomenon is identical with that in the case shown in FIG. 4B, the direction in which the fiber bundle is traversed is opposite. In this case, the fiber bundle F is moved in the direction in which the twist thereof is increased with respect to the guide rollers. Therefore, the width of the fiber bundle F measured parallel to the axis of the bobbin 3 tends to decrease as compared with that in the condition of FIG. 4A in which the fiber bundle F is not traversed.

The phenomenon of follow-up delay of the tape type carbon fiber bundle F, which thus occurs due to the traverse movement of the traverse guide unit 2, causes the width of the fiber bundle to increase when the traverse guide unit 2 is moved to right, and decrease when the traverse guide unit 2 is moved to left. The package P formed by taking up the fiber bundle tapers, so that it has a smaller diameter at the portion thereof which corresponds to the right end of the package of FIG. 1, and a larger diameter at the portion thereof which corresponds to the left end of the package of FIG. 1, the wound fiber bundle therefore being liable to come loose.

The reason why the angle $\theta_e$ at which the final guide roller $2_e$ is disposed is set in near zero degree resides in the necessity of preventing the variation, which is ascribed to the phenomenon of follow-up delay of the fiber bundle mentioned above, of the width of the fiber bundle. Referring again to FIGS. 1, 4A, 4B and 4C, in the condition of FIG. 4B in which the fiber bundle is traversed to right with the angle $\theta_e$ of the final guide roller $2_e$ set to, for example, $-5°$, a follow-up delay mentioned above occur between the final guide roller $2_e$ and bobbin 5 to cause the twisting force applied to the fiber bundle to increase. Accordingly, the twisting force lessening action occurring in the traverse guide unit 2 during the time in which the fiber bundle advances from the guide roller $2_1$ to the final guide roller $2_e$ is offset. Conversely, in the condition of FIG. 4C in which the fiber bundle is traversed to the left, a follow-up delay mentioned above occurs to cause the fiber bundle twisting force to lessen. Therefore, the twisting force increasing action occurring in the traverse guide unit 2 during the time in which the fiber bundle advances from the guide roller $2_1$ to the final guide roller $2_e$ is offset. If the angle $\theta_e$ at which the final is guide roller $2_e$ is disposed is set negative, the variation, which occurs when the carbon fiber bundle is traversed as it is twisted by the traverse guide unit 2, can be minimized.

However, if the angle $\theta_e$ of the final guide roller by which the above-mentioned action is made is less than $-15°$, a total twist angle becomes excessively large, so that it becomes difficult to carry out a stable take-up operation. In the case where the variation of the width of a tape type carbon fiber bundle can be offset easily by the deformation of the material thereof, and, in the case where the variation of the width of a fiber bundle and a difference of the diameters of wound fiber bundle can be neglected because of the smallness of the original width of the fiber bundle, setting the angle $\theta_e$ in the mentioned manner is not necessarily required. Even when the angle $\theta_e$ is set to $+5°$ at most in this case, a flat surface of the fiber bundle can always be set parallel axis to the axis of the bobbin. Accordingly, folds do not occur at the fold-back end of a traversed fiber bundle, and the object of the present invention can be achieved.

In the traverse guide unit, it is preferable that each guide roller be ready to be rotated freely and smoothly. If the traverse guide unit is set in this manner, the occurrence of fluff on the fiber bundle, which is ascribed to the friction of the guide rollers, can be minimized. It is preferable that each guide roller be supported integrally at its axial portion on a support plate. If each guide roller is thus supported integrally on a support plate, the angle of the guide roller can be maintained at a constant level, and the vibration of the guide rollers during an operation thereof can be reduced.

When a tape type carbon fiber bundle is taken up by this take-up apparatus, it is preferable that a wound angle $\theta_w$ between the fiber bundle winding direction with respect to the bobbin 3 and the circumferential direction of the bobbin, i.e. a winding angle $\theta_w$ be set at not more than $20°$. When the winding angle $\theta_w$ is set larger than $20°$, the follow-up delay of the fiber bundle F fed from the traverse guide unit 2 increases with the increase of the same angle, so that a fold is liable to occur at the fold-back end of the traversed fiber bundle. The setting of the winding angle $\theta_w$ to not more than $20°$ can be done easily by selectively setting various conditions including the width of range and the cycle of the fiber bundle traversing action, take-up speed and diameter of a winding of the fiber bundle.

Figure 3A:
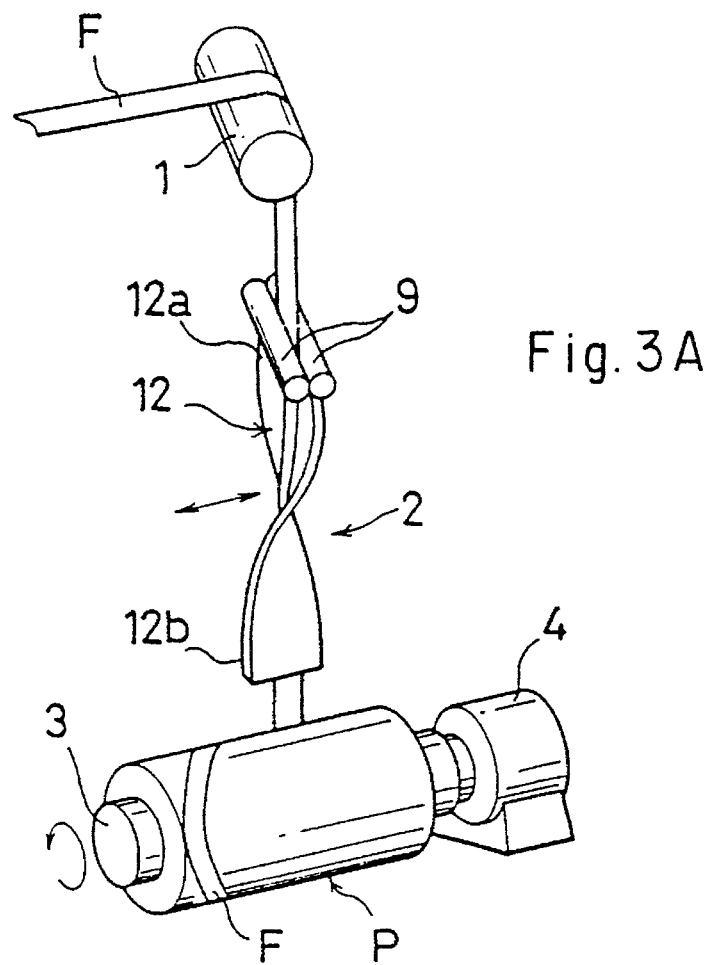
FIG. 3A is a schematic perspective view of another embodiment of the take-up apparatus according to the present invention.
Figure 3B:
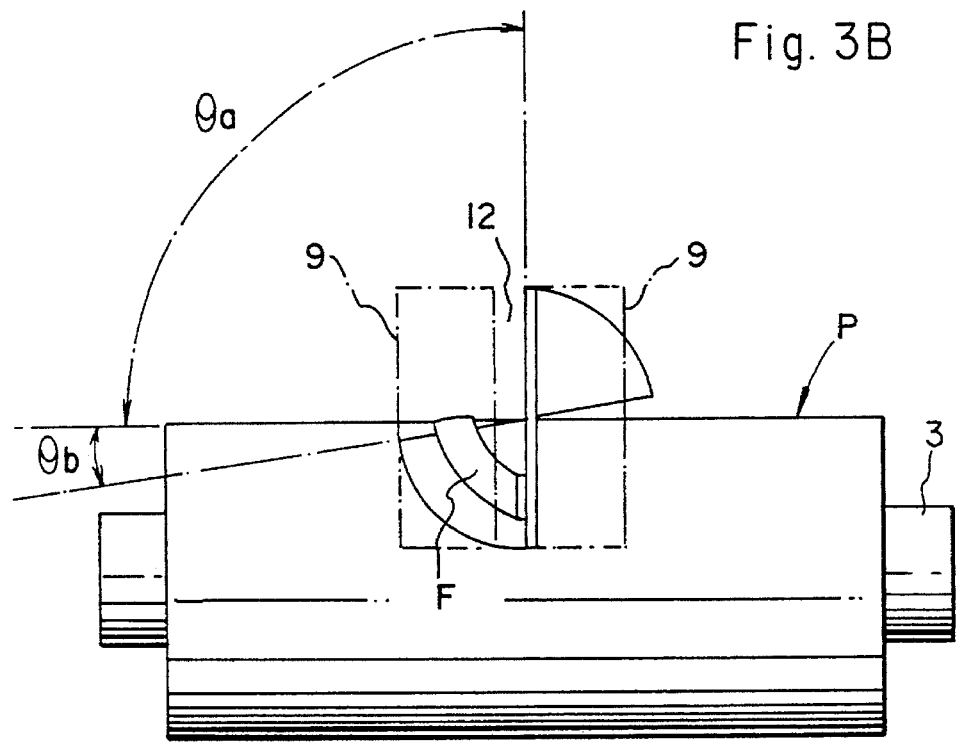
FIG. 3B is a top view of FIG. 3A

FIG. 3A shows another mode of embodiment of the present invention. In this embodiment, a helical continuing curved guide surface 12 is used instead of the above-mentioned guide rollers as a traverse guide unit. This curved guide surface 12 is formed so that an angle $\theta_a$ of a surface 12a (analogous to $\theta_c$), onto which a tape type carbon fiber bundle F is initially introduced, with respect to the axial direction of a bobbin becomes substantially $90°$ with an angle $\theta_b$ of a discharge surface 12b with respect to the axial direction of the bobbin becoming $-5°\pm10°$ (see FIG. 3B). The intermediate portion of the guide surface 12 which is between these introduction surface 12a and discharge surface 12b consists of a helically continuing curved surface having a differential angle ($\theta_a-\theta_b$). The curved guide surface 12 is provided with the above-mentioned traverse guide unit consisting of guide rollers, and it is thereby laterally moved.

The curved guide surface 12 mentioned above is adapted to guide the tape type carbon fiber bundle F, which is fed from the supply roller 1, and apply a twisting force to the flat surface thereof forcibly and gradually, whereby the flat surface can be set parallel to the axial direction of the bobbin on the discharge surface 12b.

Figure 3C:
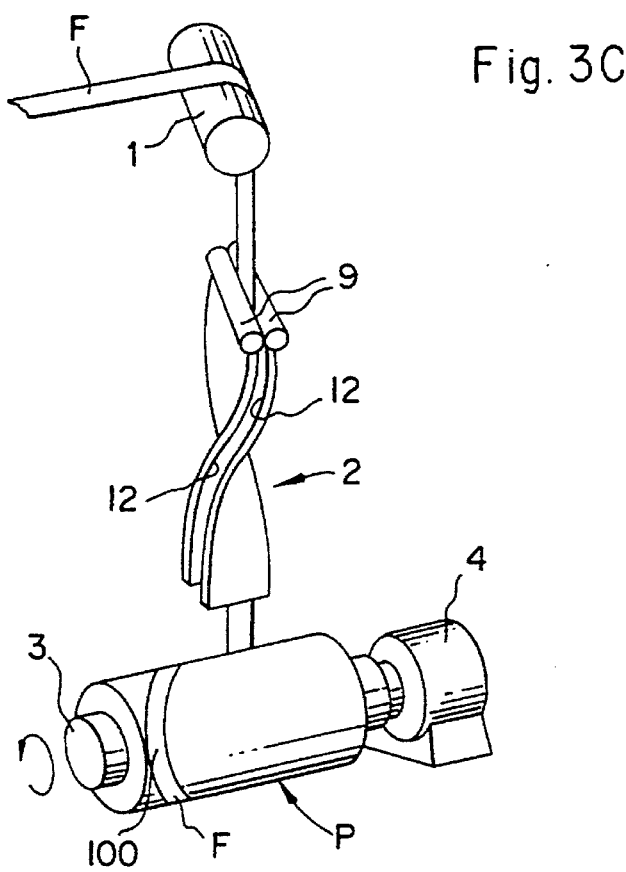
FIG. 3C shows a double plate embodiment.

Such a traverse guide unit 2 may be of a plate type as shown in FIG. 3A, and it may also be of a double plate type the front and rear sides of which being covered with walls as shown in FIG. 3C. In the case of a double plate type traverse guide unit, the fiber bundle is restricted by the inner surfaces of the front and rear walls while it is traversed, and, therefore, it becomes unnecessary to provide any auxiliary bundle displacement preventing member. In the case of a plate type traverse guide unit it is necessary to provide the introduction portion of the curved guide surface 12 with a pair of guide rollers 9 as bundle displacement preventing members. Such a displacement preventing means may consist of a slit type or comb type guide.

In the case of the take-up apparatus of FIGS. 3A and 3C, the flat surface of the tape type carbon fiber bundle can also be set parallel at all times to the axial direction of the bobbin, so that the occurrence of folds at the fold-back end of the traversed fiber bundle can be prevented, in the same manner as in the previously described embodiment. It is preferable that the curved guide surface be formed out of a selected material having high frictional resistance and surface smoothness.

Figure 1C:
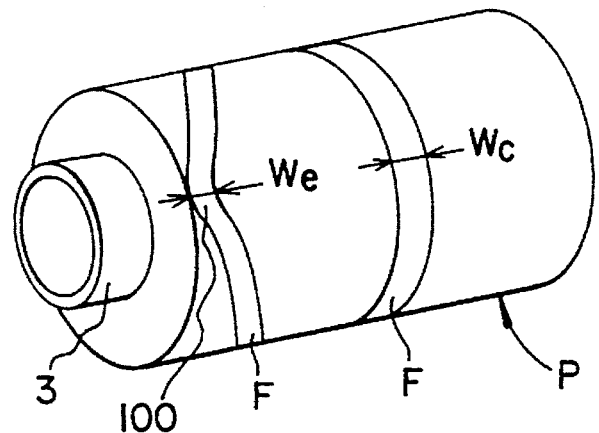

In the package obtained from the take-up apparatus according to the present invention, the flat surface of the tape type non-twisted carbon fiber bundle is laminated regularly in a diagonally crossing state, and the width We of the u-shaped 100 portion of the fiber bundle which is wound at an end portion of the package and the width Wc of the portion thereof which is wound at the intermediate portion of the package are substantially equal to each other (see FIG. 1C). In more detail, the relation between the width We of the u-shaped 100 portion of the fiber bundle which is wound at an end portion of the package and the width Wc of the portion thereof which is wound at the intermediate portion of the package can be set to We≧Wc×0.9 where the widths are measured parallel to an axial direction of the bobbin. Accordingly, folds do not occur in the carbon fiber bundle, and the width of the fiber bundle is constant, i.e., the width does not vary in the lengthwise direction thereof.

A tape type non-twisted carbon fiber bundle taken up by the take-up apparatus according to the present invention preferably has a comparatively high rigidity. Using a carbon fiber bundle having a K-value, which is representative of its rigidity, and which will be described as follows, of not less than 10 cm is recommended. If the rigidity of a carbon fibler bundle is set to a K-value of not less than 10 cm, each filament in the fiber bundle becomes difficult to be moved. Therefore, the disarray of the regularly arranged fibers can substantially be prevented when the fiber bundle is taken up by the take-up apparatus, or when the fiber bundle is released from the package obtained. This enables a package free from the occurrence of folds on the carbon fiber bundle and variation of the width of the carbon fiber bundle in the lengthwise direction thereof to be obtained more easily.

Figure 8:
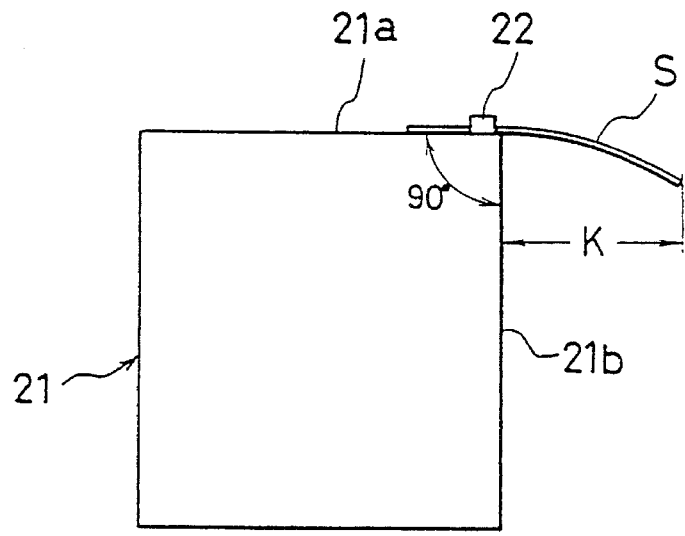
FIG. 8 illustrates a K-value measuring method defined in the present invention.

The K-value referred to above is determined by a measuring instrument shown in FIG. 8. This measuring instrument consists of a block type measuring base 21 having a setting surface 21a on which a sample S of a carbon fiber bundle F is fixed, and a measuring surface 21b, which are formed at 90° to each other. A sample S of a carbon fiber bundle is set straight in an atmosphere of 22°±3° C. and 60°±5% RH before the measurement of the sample S is conducted, by suspending a load of 0.005 g/d from the sample for 15 minutes. The sample S of fiber bundle is then fixed on the setting surface 21a of the measuring base 21 by a fixing member 22 so that the length of the portion of the sample S which projects from the measuring surface 21b becomes 25 cm. The sample S of carbon fiber bundle continues to curve at its laterally extending free end portion in the downward direction as shown in the drawing. When the fiber bundle finaly stops curving, a horizontal distance K between the measuring surface 21b and the free end of the sample S is measured. A measurement value thus obtained and expressed in terms of centimeters is determined as a K value.

In order to set the rigidity of a carbon fiber bundle so that the fiber bundle has a K value of not less than 10 cm, it is effective to use an epoxy sizing agent in, for example, a fiber bundle sizing treatment, and then subject the fiber bundle to a drying treatment at a high temperature of not lower than 200° C.

Empirical examples of the embodiments and comparative examples will now be shown, in which the evaluation of carbon fiber bundles was made as follows.

Folds on carbon fiber bundle: Number of folds appeared on a fiber bundle per 100 turns of windings thereof when the fiber bundle was released from a package thereof.

Width of carbon fiber bundle: A fiber bundle was withdrawn intermittently from a package thereof in the left and right fiber bundle traversing direction and observed at such 20 portions of the fiber bundle with respect to each fiber bundle traversing direction that correspond to the ends of every one turn of the fiber bundle, by magnifying these portions with a magnifying glass of magnifying power of 4. The width of the fiber bundle is measured with a scale graduated in 5 mm, and the measurement results were expressed in 0.1 mm. The measurement values (in millimeters) obtained at 20 portions of the fiber bundle were averaged, and the average values were shown as object values.

Appearance of wound fiber bundle: Package having a difference in the fiber bundle winding tightness between the left and right portions thereof and being likely to come loose was rated "bad".

EXAMPLES 1–3 AND COMPARATIVE EXAMPLES 1–3

Six apparatuses (for Examples 1 to 3 and Comparative Examples 1 to 3) having travere guide units shown in FIG. 1 in which a maximum difference between the angles of the guide rollers varies as shown in Table 1 were set up. In each of these take-up apparatuses provided with such traverse guide units, a tape type non-twisted carbon fiber bundle which will be defined later was taken up around a bobbin of 80 mm in outer diamter and 200 mm in length with a traverse width of 15 cm and at a traverse speed of 1 m/min and a winding angle of 10°.

This tape type non-twisted carbon fiber bundle was prepared by baking 12000-filament polyacrylonitrile fiber yarn of a fineness of 1.3 denier by a regular method, and the resultant fiber yarn was introduced into a bath of a concentration of 3% by weight of diglycidyl ether bisphenol A type epoxy resin so as to be subjected to a sizing treatment. The resultant fiber bundle had a weight of per unit length of 0.8 g/m.

The guide rollers in the above-mentioned traverse guide unit consisted of five SUS rollers of 15 mm in diameter and 30 mm in length, and were assembled by disposing the same rotatably so that a minimum distance between two adjacent rollers became 20 mm as shown in FIG. 2. These guide rollers were disposed inclinigly so that the angles of inclination $\theta_1$, $\theta_e$ of an introduction guide roller and a final glide roller were 90° and −5°, respectively.

A carbon fiber bundle was withdrawn from a package obtained from each take-up apparatus, and the width We (mm) of the u-shaped 100 portion of the fiber bundle which corresponded to an end portion of the package and that the width Wc (mm) of the portion of the fiber bundle which corresponded to an intermediate portion thereof, and the number of folds found on the fiber bundle were determined. The results shown in Table 1 were obtained.

TABLE 1

| | maximum difference between angles of rollers | running condition of fiber bundle | width of fiber bundle | | number of folds on fiber bundle |
|---|---|---|---|---|---|
| | | | We (mm) | Wc (mm) | |
| Example 1 | 30° | good | 5.9 | 5.8 | 0 |
| Example 2 | 35° | good | 5.8 | 5.8 | 0 |
| Example 3 | 40° | width was reduced at a twisted portion | 5.5 | 5.7 | 0 |
| Comparative Example 1 | 45° | width was reduced at a twisted portion | 5.3 | 5.6 | 0 |
| Comparative Example 2 | 50° | fold occurred on a twisted portion | 5.0 | 5.4 | 9 |
| Comparative Example 3 | 55° | fold occured on a twisted portion | 4.8 | 5.3 | 27 |

EXAMPLES 4–8 AND COMPARATIVE EXAMPLES 4–6

Take-up apparatuses were set up so that they had the same conditions as the apparatus used in Example 1 except that a maximum difference between the angles of guide rollers was set to 35° with the angle $\theta_e$ only of a final guide roller set to different levels in different apparatuses, and a tape type non-twisted carbon fiber bundle which was identical with the fiber bundle in Example 1 was taken up under the same take-up conditions.

The carbon fiber bundle was released from a package obtained in each take-up apparatus to check the number of folds thereon, determine the width thereof and evaluate the appearance of the winding thereof. The results shown in Table 2 were obtained.

TABLE 2

| | angle $\theta_c$ of final roller | appearance of winding | number of folds on carbon fiber bundle | width (mm) of carbon fiber bundle | |
|---|---|---|---|---|---|
| | | | | rightward direction | leftward direction |
| Comparative Example 4 | −20° | bad | 0 | 5.3 | 5.6 |
| Example 4 | −15° | good | 0 | 5.5 | 5.7 |
| Example 5 | −10° | good | 0 | 5.7 | 5.8 |
| Example 6 | −5° | good | 0 | 5.8 | 5.8 |
| Example 7 | 0° | good | 0 | 5.9 | 5.8 |
| Example 8 | 5° | good | 0 | 5.9 | 5.7 |

TABLE 2-continued

| | angle $\theta_c$ of final roller | appearance of winding | number of folds on carbon fiber bundle | width (mm) of carbon fiber bundle | |
|---|---|---|---|---|---|
| | | | | rightward direction | leftward direction |
| Comparative Example 5 | 10° | bad | 0 | 6.0 | 5.7 |
| Comparative Example 6 | 15° | bad | 0 | 6.0 | 5.6 |

EXAMPLE 9

The same tape type non-twisted carbon fiber bundle as in Example 1 was taken up under the same take-up conditions therein with a maximum difference between the angles of the guide rollers in the traverse guide unit set to 30°. A winding angle was varied to 5°, 10°, 20°, 25° and 30° in accordance with a fiber bundle traversing speed. As a result, no folds were found on the fiber bundle taken up with a winding angle of not more than 20°, and folds occurred on the fiber bundle taken up with a winding angle of not less than 25°.

COMPARATIVE EXAMPLE 7

Figure 6:
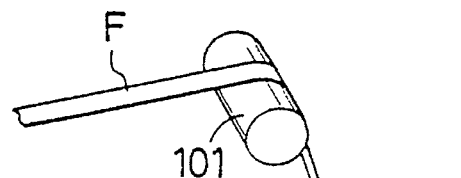
FIG. 6 is a schematic perspective view of a conventional take-up apparatus.
Figure 7:
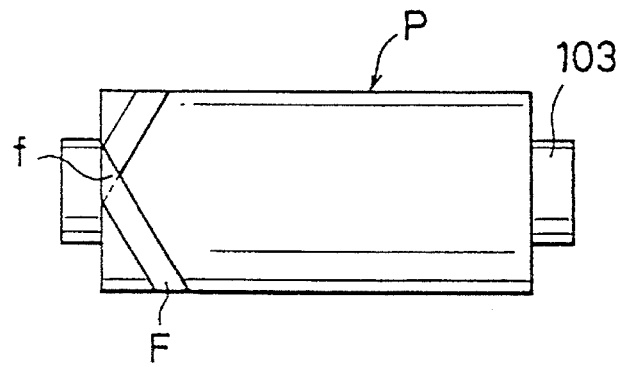
FIG. 7 is a schematic front elevation of a package of a tape type non-twisted carbon fiber bundle which is taken up by a conventional take-up apparatus.
Figure 7:
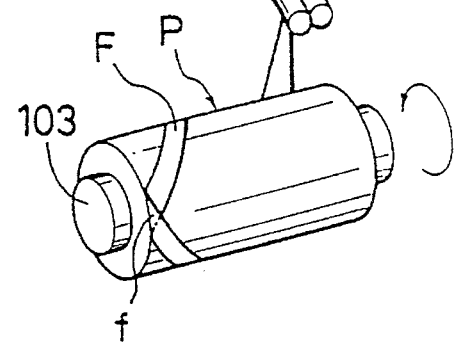

The same tape type non-twisted carbon fiber bundle as in Example 1 was taken up under the same take-up conditions therein except that the take-up apparatus shown in FIG. 6 and having a pair of traverse guide rollers of 20 mm in diameter was used.

The fiber bundle was released from the package obtained, and the condition of occurrence of folds thereon was checked. It was ascertained that the fiber bundle had 131 folds. It was also ascertained that the width of the fiber bundle varied in its lengthwise direction in the range of 4.1 to 5.5 mm.

EXAMPLES 10–12 AND COMPARATIVE EXAMPLES 8–9

A flat SUS plate 50 mm in width and 20 cm in length was twisted helically to form a curved surface shown in FIG. 3. An angle $\theta_a$ of its introduction surface portion and an angle $\theta_b$ of its discharge surface portion were set different as shown in Table 3. A pair of guide rollers 10 mm in diameter were provided above the introduction surface portion. Take-up apparatuses (for Examples 10 to 12 and Comparative Examples 8 to 9) provided with such parts were made. The same tape type non-twisted carbon fiber bundle as in Example 1 was taken up under the same take-up conditions in each of these take-up apparatuses.

The appearance of a package obtained in each take-up apparatus was evaluated, and the fiber bundle was released from the package to check the number of folds on and the variation of the width of the fiber bundle. The results shown in Table 3 were obtained.

TABLE 3

| | angle (θ) of curved guide surface | | | appearance of winding | number of folds | width (mm) of fiber bundle | |
|---|---|---|---|---|---|---|---|
| | introduction surface portion | discharge surface portion | total twist angle | of fiber bundle | on fiber bundle | rightward direction | leftward direction |
| Example 10 | 90° | −5° | 95° | good | 0 | 6.2 | 6.2 |
| Example 11 | 90° | 3° | 87° | good | 0 | 6.3 | 6.1 |
| Example 12 | 90° | 0° | 90° | good | 0 | 6.3 | 6.2 |
| Comparative Example 8 | 90° | 7° | 83° | bad | 0 | 6.5 | 6.1 |
| Comparative Example 9 | 90° | −17° | 107° | bad | 0 | 5.6 | 6.0 |

EXAMPLES 13–16 AND COMPARATIVE EXAMPLES 10–11

The same carbon fiber bundles as in Example 1 were subjected to a sizing treatment. The resultant fiber bundles were then subjected to a heat treatment and a drying treatment with the conditions for these steps set differently. Consequently, tape type non-twisted carbin fiber bundles having different K values shown in Table 4 were obtained. These fiber bundles were then taken up by the same take-up apparatus as in Example 1 under the same take-up conditions.

The width We of the u-shaped 100 portions of the fiber bundles in each package obtained which was on an end portion of the package and the width Wc of the portion of the fiber bundle therein which was on the intermediate portion of the package were measured, and the results shown in Table 4 were obtained.

The fiber bundle was released from each package, and a prepreg in which a plurality of fiber bundles were arranged in one direction was made. The external appearance of the prepreg was observed, and the variation of the width of per one bundle in the prepreg was determined. The results shown in Table 4 were obtained.

TABLE 4

| | K value (cm) | width of fiber bundle in a package | | | external appearance of prepreg | width (mm) of prepreg per one fiber bundle therein |
|---|---|---|---|---|---|---|
| | | We (mm) | Wc (mm) | We/Wc | | |
| Comparative Example 10 | 4 | 5.0 | 5.3 | 0.94 | Opening was observed | 8–10 |
| Comparative Example 11 | 7 | 5.0 | 5.2 | 0.96 | Opening was observed | 8–10 |
| Example 13 | 10 | 5.8 | 5.3 | 1.09 | good | 9–10 |
| Example 14 | 15 | 4.8 | 5.3 | 0.91 | good | 9.5–10.5 |
| Example 15 | 15 | 5.3 | 5.2 | 1.02 | good | 10–11 |
| Example 16 | 15 | 6.8 | 5.2 | 1.31 | good | 10.5–11.5 |

What is claimed is:

1. A take-up apparatus for tape type non-twisted carbon fiber bundles consolidated into a sheet by a resin composition, comprising:

guide rollers adapted to first receive said carbon fiber bundles from a fiber bundle supply source;

a bobbin adapted to take up therearound said carbon fiber bundles sent out from said guide roller structure;

a driving means for rotating said bobbin; and a traverse drive unit adapted to traverse said guide roller structure and said bobbin reciprocatingly and relatively to each other in parallel with the axial direction of said bobbin, said guide roller structure including an introduction guide roller in cylinder shape disposed so that an angle $\theta_1$ between an axial direction of said introduction guide roller and an axial direction of said bobbin is substantially 90°, a final guide roller in cylinder shape disposed so that an angle $\theta_e$ between an axial direction of the final guide roller and the axial direction of said bobbin is in a range from −15° to +5°, and a plurality of intermediate guide rollers in cylinder shape disposed between said introduction guide roller and said final guide roller so that an angle difference between one intermediate guide roller and an adjacent guide roller is not more than 45°.

2. A take-up apparatus according to claim 1, wherein a direction in which said fiber bundle is wound around said bobbin is set to not more than 20° with respect to a circumferential direction of said bobbin.

3. A take-up apparatus according to claim 1, wherein said guide roller structure is adapted to be traversed reciprocatingly in parallel with the axial direction of said bobbin by said traverse drive unit.

* * * * *